(12) United States Patent
Wang (10) Patent No.: US 11,627,279 B2
(45) Date of Patent: Apr. 11, 2023

(54) METHOD AND APPARATUS FOR DISPLAYING INTERACTIVE INFORMATION IN PANORAMIC VIDEO

(71) Applicant: Alibaba Group Holding Limited, Grand Cayman (KY)

(72) Inventor: Weiyi Wang, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 125 days.

(21) Appl. No.: 16/255,525

(22) Filed: Jan. 23, 2019

(65) Prior Publication Data

US 2019/0230308 A1    Jul. 25, 2019

(30) Foreign Application Priority Data

Jan. 24, 2018   (CN) .......................... 201810067835.7

(51) Int. Cl.
*H04N 5/445*    (2011.01)
*H04N 5/232*    (2006.01)
(Continued)

(52) U.S. Cl.
CPC ......... *H04N 5/445* (2013.01); *G06F 3/04815* (2013.01); *H04N 5/23238* (2013.01); *H04N 21/4316* (2013.01); *H04N 21/816* (2013.01)

(58) Field of Classification Search
None
See application file for complete search history.

(56) References Cited

U.S. PATENT DOCUMENTS

| 10,165,261 B2 * | 12/2018 | Valdivia | G06F 3/0482 |
| 2011/0164163 A1 * | 7/2011 | Bilbrey | H04N 21/42202 348/E5.022 |

(Continued)

FOREIGN PATENT DOCUMENTS

| CN | 101908095 A | 12/2010 |
| CN | 203706134 A | 7/2014 |

(Continued)

OTHER PUBLICATIONS

The PCT Search Report and Written Opinion dated Apr. 16, 2019 for PCT Application No. PCT/US19/14790, 10 pages.

(Continued)

*Primary Examiner* — Kaitlin A Retallick
(74) *Attorney, Agent, or Firm* — Lee & Hayes, P.C.

(57) ABSTRACT

A method and an apparatus for displaying interactive information in a panoramic video are disclosed. The method includes determining a first interactive information display area corresponding to a perspective of a first camera position of the panoramic video; and displaying first interactive information in the first interactive information display area corresponding to the perspective of the first camera position when playing an image associated with the perspective of the first camera position. According to the present disclosure, a display position of the first interactive information is not changed along with a head turning action of a user, etc. As such, when the user wants to see the first interactive information, the user can adjust the line of sight to a determined position for viewing, thus increasing an attraction of the first interactive information display area to the user, and helping to enhance the user experience.

16 Claims, 6 Drawing Sheets

(51) Int. Cl.
*H04N 21/431* (2011.01)
*H04N 21/81* (2011.01)
*G06F 3/04815* (2022.01)

(56) References Cited

U.S. PATENT DOCUMENTS

| | | | |
|---|---|---|---|
| 2012/0113209 A1 | 5/2012 | Ritchey | |
| 2012/0249586 A1 | 10/2012 | Wither et al. | |
| 2013/0207973 A1 | 8/2013 | Mattila | |
| 2013/0322845 A1* | 12/2013 | Suzuki | H04N 9/87 386/230 |
| 2015/0062114 A1 | 3/2015 | Ofstad | |
| 2015/0234547 A1* | 8/2015 | Barnett | G06F 3/04842 715/768 |
| 2018/0098059 A1* | 4/2018 | Valdivia | G06Q 50/01 |
| 2018/0124477 A1* | 5/2018 | Qu | H04N 21/8545 |
| 2019/0230308 A1* | 7/2019 | Wang | H04N 5/23293 |

FOREIGN PATENT DOCUMENTS

| | | |
|---|---|---|
| CN | 105916001 A | 8/2016 |
| CN | 107197339 A | 9/2017 |

OTHER PUBLICATIONS

Translation of Chinese Office Action dated Dec. 4, 2019, from corresponding CN Patent Application No. 201810067835.7, 7 pages.
Translation of Chinese Serach Report dated Nov. 26, 2019, from corresponding CN Patent Application No. 201810067835.7, 1 pages.
Machine Translation of Third Chinese Office Action dated Jan. 5, 2021, from corresponding CN Patent Application No. 201810067835.7, 8 pages.
Machine Translation of Second Chinese Office Action dated Jun. 15, 2020, from corresponding CN Patent Application No. 201810067835.7, 12 pages.
Machine Translation of Chinese Search Report dated Jun. 6, 2020, from corresponding CN Patent Application No. 201810067835.7, 1 pages.

* cited by examiner

METHOD AND APPARATUS FOR DISPLAYING INTERACTIVE INFORMATION IN PANORAMIC VIDEO

CROSS REFERENCE TO RELATED PATENT APPLICATIONS

This application claims priority to Chinese Patent Application No. 201810067835.7, filed on 24 Jan. 2018, entitled "Method and Apparatus for Displaying Interactive Information in Panoramic Video," which is hereby incorporated by reference in its entirety.

TECHNICAL FIELD

The present disclosure relates to the field of panoramic video display, and particularly to policy deployment methods and apparatuses for displaying interactive information in panoramic video.

BACKGROUND

When viewing a panoramic video such as VR (virtual reality), a user can enjoy 360° omni-directional display content at a current camera position by turning the head or the like. Since a viewing angle of the user is very flexible, how to present interactive information to the user is a problem that needs to be solved.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view thereof, the present disclosure proposes a method for displaying interactive information in a panoramic video. The present disclosure also proposes corresponding apparatus and computer readable storage media.

According to an aspect of the present disclosure, a method for displaying interactive information in a panoramic video is provided, which includes determining a first interactive information display area corresponding to a perspective of a first camera position of the panoramic video; and displaying first interactive information in the first interactive information display area corresponding to the perspective of the first camera position when playing an image associated with the perspective of the first camera position.

In implementations, determining the first interactive information display area corresponding to the perspective of the first camera position of the panoramic video includes determining a distance and an angle of the first interactive information display area relative to the perspective of the first camera position, to determine the first interactive information display area corresponding to the perspective of the first camera position.

In implementations, determining the first interactive information display area corresponding to the perspective of the first camera position of the panoramic video includes determining at least one candidate interactive information display area corresponding to the perspective of the first camera position; identifying an image of each candidate interactive information display area; and determining the first interactive information display area from the at least one candidate interactive information display area based on the identified image.

In implementations, displaying the first interactive information in the first interactive information display area corresponding to the perspective of the first camera position includes displaying a semi-transparent map layer in the first interactive information display area, and displaying the first interactive information on the semi-transparent map layer.

In implementations, the method further includes determining a second interactive information display area corresponding to the first camera position according to the first interactive information display area corresponding to the first camera position; and displaying second interactive information in the second interactive information display area corresponding to the perspective of the first camera position when playing the image associated with the perspective of the first camera position.

In implementations, the panoramic video is a three-dimensional panoramic video, the first interactive information display area is a two-dimensional area, and the second interactive information display area includes a first sub-area that is coplanar with the first interactive information display area.

In implementations, the panoramic video is a three-dimensional panoramic video, the first interactive information display area is a two-dimensional area, and the second interactive information display area includes at least one second sub-area that is parallel to the first interactive information display area.

According to another aspect of the present disclosure, an apparatus for displaying interactive information in a panoramic video is provided, which includes a first interactive information display area determination module used for determining a first interactive information display area corresponding to a perspective of a first camera position of the panoramic video; and a first interactive information display module used for displaying first interactive information in the first interactive information display area corresponding to the perspective of the first camera position when playing an image associated with the perspective of the first camera position.

In implementations, the first interactive information display area determination module includes a first determination sub-module used for determining a distance and an angle of the first interactive information display area relative to the perspective of the first camera position, to determine the first interactive information display area corresponding to the perspective of the first camera position.

In implementations, the first interactive information display area determination module includes a candidate interactive information display area determination sub-module used for determining at least one candidate interactive information display area corresponding to the perspective of the first camera position; an image identification sub-module used for identifying an image of each candidate interactive information display area; and a second determination sub-module used for determining the first interactive information display area from the at least one candidate interactive information display area based on the identified image.

In implementations, the first interactive information display module includes a display sub-module used for displaying a semi-transparent map layer in the first interactive information display area, and displaying the first interactive information on the semi-transparent map layer.

In implementations, the apparatus further includes a second interactive information display area determination module used for determining a second interactive information display area corresponding to the first camera position based on the first interactive information display area corresponding to the first camera position; and a second interactive information display module used for displaying second interactive information in the second interactive information display area corresponding to the perspective of the first camera position when playing the image associated with the perspective of the first camera position.

In implementations, the panoramic video is a three-dimensional panoramic video, the first interactive information display area is a two-dimensional area, and the second interactive information display area includes a first sub-area that is coplanar with the first interactive information display area.

In implementations, the panoramic video is a three-dimensional panoramic video, the first interactive information display area is a two-dimensional area, and the second interactive information display area includes at least one second sub-area that is parallel to the first interactive information display area.

According to another aspect of the present disclosure, an apparatus for displaying interactive information in a panoramic video is provided, which includes processor(s); and a storage device configured to store processor executable instructions, wherein the processor(s) is/are configured to perform the above method.

According to another aspect of the present disclosure, a non-volatile computer readable storage media is provided, on which computer program instructions are stored, wherein the computer program instructions, when executed by processor(s), perform the above method.

By determining a first interactive information display area corresponding to a perspective of a first camera position and displaying first interactive information in the first interactive information display area when an image associated with the perspective of the first camera position is played, this makes a display position of the first interactive information not to be changed along with a head turning action of a user and the like. As such, when the user wants to see the first interactive information, the user can adjust the line of sight to a determined position for viewing, thus increasing an attraction of such specific area (i.e., the first interactive information display area) to the user, and helping to enhance the user experience. Other features and aspects of the present disclosure will become apparent from detailed description of exemplary embodiments based on accompanying drawings as follows.

BRIEF DESCRIPTION OF THE DRAWINGS

The accompanying drawings, which are included in the specification and form a part of the specification, illustrate exemplary embodiments, features and aspects of the present disclosure with the specification, and are used for describing the principles of the present disclosure.

DETAILED DESCRIPTION

Various exemplary embodiments, features, and aspects of the present disclosure are described in detail hereinafter with reference to the accompanying drawings. The same reference numerals in the accompanying drawings denote the same or similar elements. Although various aspects of the embodiments are shown in the accompanying drawings, and the accompanying drawings may not necessarily be drawn to scale unless stated otherwise.

A term "exemplary" that is used exclusively herein to mean "serving as an example, an embodiment, or an illustrative purpose". Any embodiment described herein as "exemplary" may not necessarily be construed as being more preferred or better than other embodiments.

In addition, for the purpose of describing the present disclosure in a better manner, a number of specific details are set forth in specific implementations as follows. One skilled in the art should understand that the present disclosure can also be implemented without certain specific details. In some instances, methods, means, components, and circuits that are well known to one skilled in the art are not described in detail for the sake of putting emphasis on the present disclosure.

Figure 1:
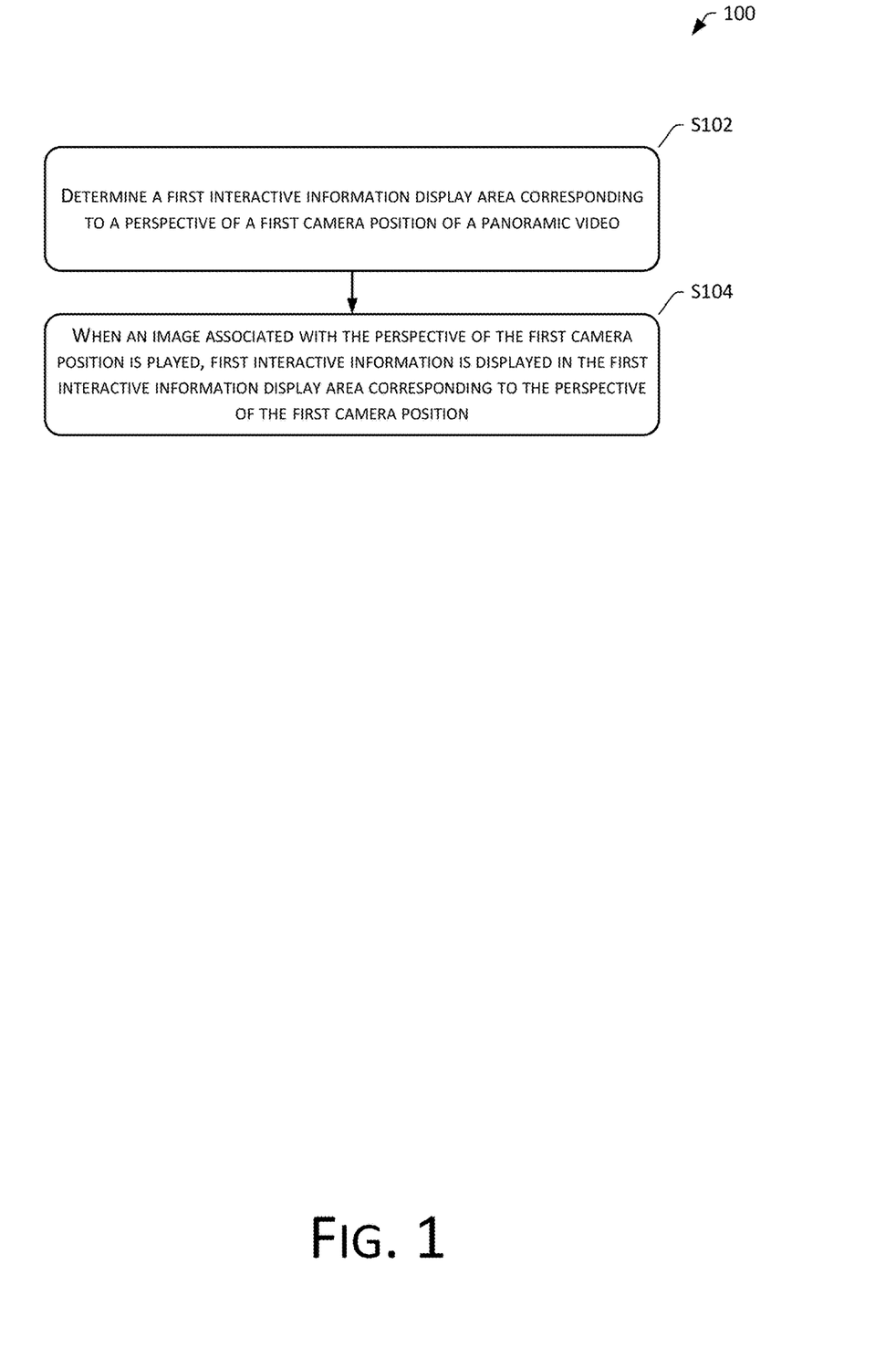
FIG. 1 illustrates a method for displaying interactive information in a panoramic video in accordance with an embodiment of the present disclosure.

FIG. 1 illustrates a flow chart of a method 100 for displaying interactive information in a panoramic video in accordance with an embodiment of the present disclosure. As shown in FIG. 1, the method 100 includes the following operations.

S102: Determine a first interactive information display area corresponding to a perspective of a first camera position of a panoramic video.

From the perspective of the first camera position of the panoramic video, a user can view a 360° panorama image by rotating the head and the like. Therefore, each camera position corresponds to a plurality of real-time display areas. The first interactive information display area corresponds to the perspective of the first camera position, and does not change as a real-time display area is changed. For example, when the line of sight of the user turns to a certain direction, the first interactive information display area may be located in the middle of the real-time display area at this time. When the line of sight of the user turns to the other direction, the first interactive information display area may not appear in the real-time display area at this time.

In implementations, the first interactive information display area may be a two-dimensional area. In implementations, the first interactive information display area may be a three-dimensional area.

One skilled in the art can configure the first interactive information display area as any shape as needed, such as a rectangle, an ellipse, a cloud, a cube, a sphere, etc.

A terminal device may parse and analyze information representing the first interactive information display area according to panoramic video data received from a server, and may also determine the first interactive information display area locally.

S104: When an image associated with the perspective of the first camera position is played, first interactive information is displayed in the first interactive information display area corresponding to the perspective of the first camera position.

In implementations, the first interactive information may include a user comment. In implementations, the first interactive information may include a barrage, and the barrage may be dynamically moved and displayed. In implementations, the first interactive information may include both a user comment and a barrage. The first interactive information may further include other user interactive information. For example, in a VR live video, the first interactive information may include information about a user entering/exiting a live room, reward information, etc.

In implementations, the first interactive information may include text information. In implementations, the first interactive information may include an emoji (expression) icon. In implementations, the first interactive information may include both text information and an emoji icon.

In implementations, a semi-transparent map layer may be displayed in the first interactive information display area, and the first interactive information is displayed on the semi-transparent map layer. For example, the first interactive information display area may be presented as a translucent panel having a certain grayscale, and the first interactive information may be displayed on the translucent panel to facilitate a user to better distinguish between the first interactive information and original content of the video.

By determining a first interactive information display area corresponding to a perspective of a first camera position and displaying first interactive information in the first interactive information display area when an image associated with the perspective of the first camera position is played, this makes a display position of the first interactive information not to be changed along a head turning action of a user and the like. As such, when the user wants to see the first interactive information, the user can adjust the line of sight to a determined position for viewing, thus increasing an attraction of such specific area (i.e., the first interactive information display area) to the user, and helping to enhance the user experience.

In implementations, in the foregoing operation 102, determining the first interactive information display area corresponding to the perspective of the first camera position of the panoramic video may include determining a distance and an angle of the first interactive information display area relative to the perspective of the first camera position to determine the first interactive information display area corresponding to the perspective of the first camera position. For example, a distance of a central position of the first interactive information display area with respect to the perspective of the first camera position may first be determined, and an angle of the central location of the first interactive information display area with respect to the perspective of the first camera position may then be determined. The first interactive information display area is then constructed based on the central position.

Figure 2A:
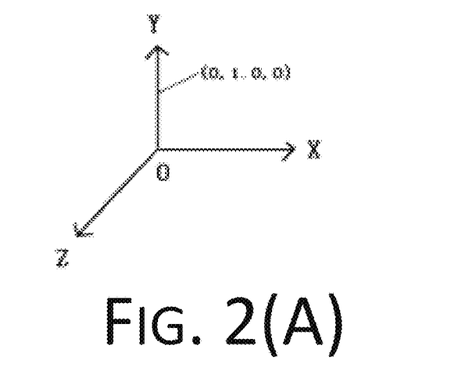
FIGS. 2(A), (B) and (C) are schematic diagrams illustrating determination of a position of a first interactive information display area from the perspective of a certain camera position of a certain VR live broadcast.
Figure 2B:
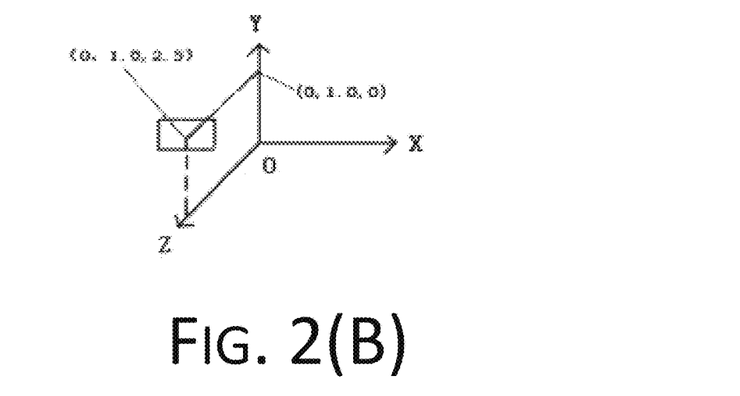
Figure 2C:
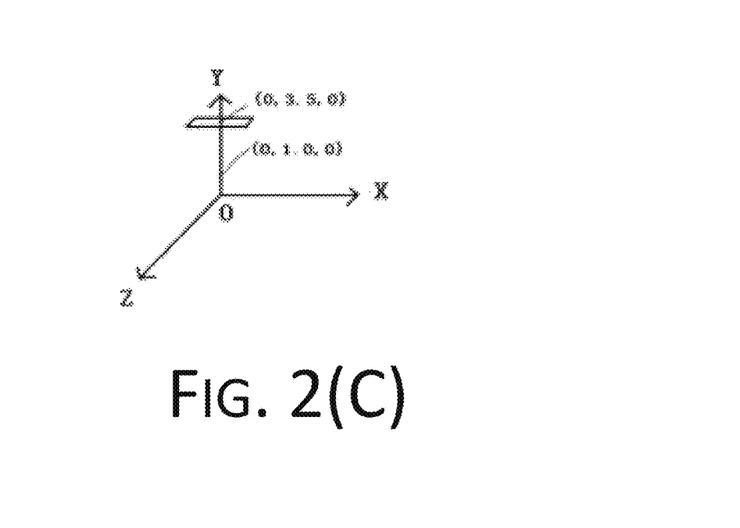

FIGS. 2(A), (B) and (C) are schematic diagrams illustrating a determination of a position of a first interactive information display area from the perspective of a certain location of a certain VR live broadcast.

A three-dimensional Cartesian coordinate system as shown in FIG. 2(A) is a default coordinate system of the perspective of a camera position. The XOZ plane of the Cartesian coordinate system represents the ground plane. Coordinates (0, 1.0, 0) (unit: m) can be considered as a visual origin of the perspective of the camera position, i.e., video is 360° viewable at that position.

The perspective of each camera position of the panoramic video usually comes along with a default Cartesian coordinate system, which can be determined by a video producer as needed. When image(s) presented by perspective(s) of certain/some camera position(s) need(s) to be modified, one skilled in the art can edit specific portion(s) of the image(s) of the perspective(s) of the camera position(s) based on corresponding default coordinate system(s) at video production end/video playback end. The video playback end may also set a Cartesian coordinate system as needed.

FIG. 2(B) shows a schematic diagram of determining a distance of the first interactive information display area relative to the perspective of the camera position. In this example, the distance is set to be 2.5 m. In addition, an angle of the first interactive information display area with respect to the perspective of the camera position may be set to be (0, 0), the former means that an angle around the X axis is 0°, and the latter means that an angle around the Y axis is 0°. Then, as shown in FIG. 2(B), an initial coordinate of the center of the first interactive information display area is (0, 1.0, 2.5).

FIG. 2(C) shows a schematic diagram of determining an angle of the first interactive information display area with respect to the perspective of the camera position. In this example, the angle is set to be (90, 0), the former represents an angle around the X axis is 90°, and the latter represents an angle around the Y axis is 0°. A finally determined coordinate of the center first interactive information display area is (0, 3.5, 0) and is parallel to the XOZ plane.

It should be noted that, although specific setting data is used above as an example for describing a position of a first interactive information display area according to the present disclosure, one skilled in the art can understand that the present disclosure should not be limited thereto. In fact, persons who implement the scheme can flexibly set a first interactive information display area according to personal preferences and/or actual application scenarios. For example, for a larger panoramic video scene, such as a basketball court, a fighting platform, a concert, etc., the distance of the first interactive information display area relative to the perspective of the camera position may be set to be relatively large, for example, several tens meters. For a smaller panoramic video scene, such as a folk music live broadcast room, a mini club, etc., the distance of the first interactive information display area relative to the perspective of the camera position may be set to be relatively small, such as several meters. Similarly, persons who implement the scheme can flexibly set the angle of the first interactive information display area relative to the perspective of the camera position as needed, which is not limited by the present disclosure.

In implementations, determining the first interaction information display area corresponding to the perspective of the first camera position of the panoramic video may include determining at least one candidate interaction information display area corresponding to the perspective of the camera position; identifying an image of each candidate interactive information display area; and determining the first interactive information display area from the at least one candidate interactive information display area based on the identified image.

For example, in one instance, each candidate interactive information display area may be determined by determining a distance and an angle of the respective candidate interactive information display area relative to the perspective of the first camera position. An image of the respective candidate interactive information display area is then identified to determine the first interactive information display area. For example, various candidate interactive information display areas may have different priorities, and a candidate interactive information display area with the highest priority may be identified first. By incorporating with big data analysis, a determination is made as to whether information represented by an image of the identified area is important. If not important, the candidate interactive information display area with the highest priority is determined as the first interactive information display area. If important, a candidate interactive information display area with the second highest priority is identified until the first interactive information display area is determined. For example, images of various candidate interactive information display areas may be identified, and the first interactive information display area may be selected from the candidate interactive information display areas based on importance degrees of respective information expressed thereby using the big data analysis.

In implementations, the method may further include determining a second interactive information display area corresponding to the first camera position based on the first interactive information display area corresponding to the first camera position; and displaying second interaction information in the second interactive information display area corresponding to the perspective of the first camera position when playing the image associated with the perspective of the first camera position.

For example, the first interactive information display area may be used for displaying user comments (i.e., the first interactive information), and the second interactive information display area may be used for displaying a barrage (i.e., the second interactive information). Alternatively, the first interactive information display area can be used for displaying textual interactive information (i.e., the first interactive information), and the second interactive information display area can be used for displaying an emoji icon (i.e., the second interactive information), etc.

In this implementation, by displaying different interactive information in different interactive information display areas, the user is allowed to quickly view information that is desired to be seen, thus reducing interference and providing a richer visual experience.

In implementations, the panoramic video is a three-dimensional panoramic video, the first interactive information display area is a two-dimensional area, and the second interactive information display area includes a first sub-area that is coplanar with the first interactive information display area.

For example, in one instance, the first interactive information display area may display a semi-transparent map layer, and display user comments on the semi-transparent map layer. The first sub-area in the second interactive information display area may be transparent, and may be used for displaying a barrage. The barrage can be dynamically displayed in the second interactive information display area in a moving manner.

For example, in one instance, the first interactive information display area and the first sub-area in the second interactive information display area may be overlapped. For example, the first interactive information display area may be located within the first sub-area.

Figure 3:
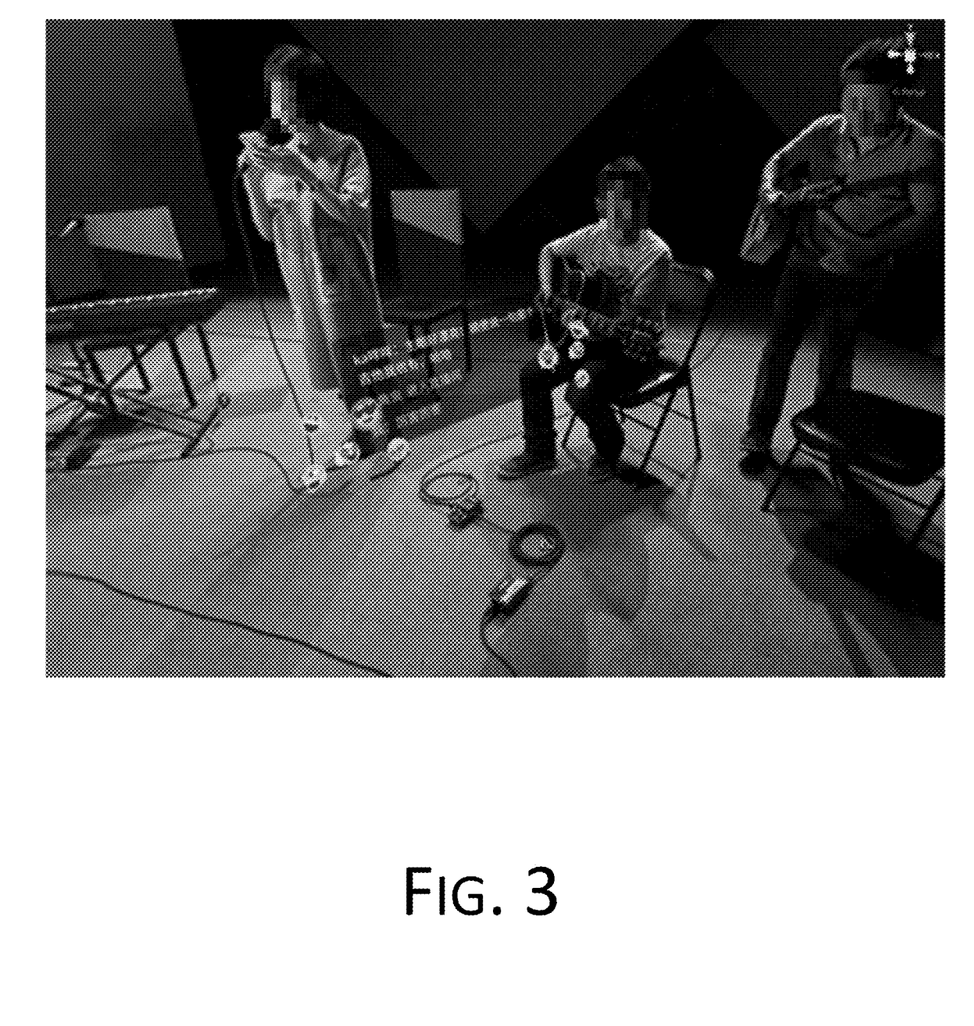
FIG. 3 illustrates a scene schematic diagram of displaying interactive information in a VR live broadcast according to an exemplary embodiment of the present disclosure.

FIG. 3 illustrates a scene schematic diagram of displaying interactive information in a VR live broadcast according to an exemplary embodiment of the present disclosure. As shown in the figure, in this example, a semi-transparent panel that is located in the middle of an image (i.e., which is equivalent to the first interactive information display area) can be used for displaying user comments, user entering/leaving live broadcasts, and reward information, etc. The second interactive information display area having an area larger than the semi-transparent panel can display various emoji icons. In one example, these emoji icons are provided by the user. In one example, these emoji icons are generated according to content that is displayed in the first interactive information display area. In one example, these emoji icons include both of the above.

In implementations, the panoramic video is a three-dimensional panoramic video, the first interactive information display area is a two-dimensional area, and the second interactive information display area includes at least one second sub-area that is is parallel to the first interactive information display area. In one example, the first interactive information display area may provide user comments, and each second sub-area in the second interactive information display area may be used for displaying a barrage.

One skilled in the art can understand that various implementations of the present disclosure may be combined with each other provided that no conflict exists. In one example, the second interactive information display area may include a first sub-area that is coplanar with the first interactive information display area only. In one example, the second interactive information display area may include at least one (e.g., one or more than one) second sub-area that is parallel to the first interactive information display area only. In one example, the second interactive information display area may include both the first sub-area that is coplanar with the first interactive information display and the at least one second sub-area that is parallel to the first interactive information display area.

Figure 4:
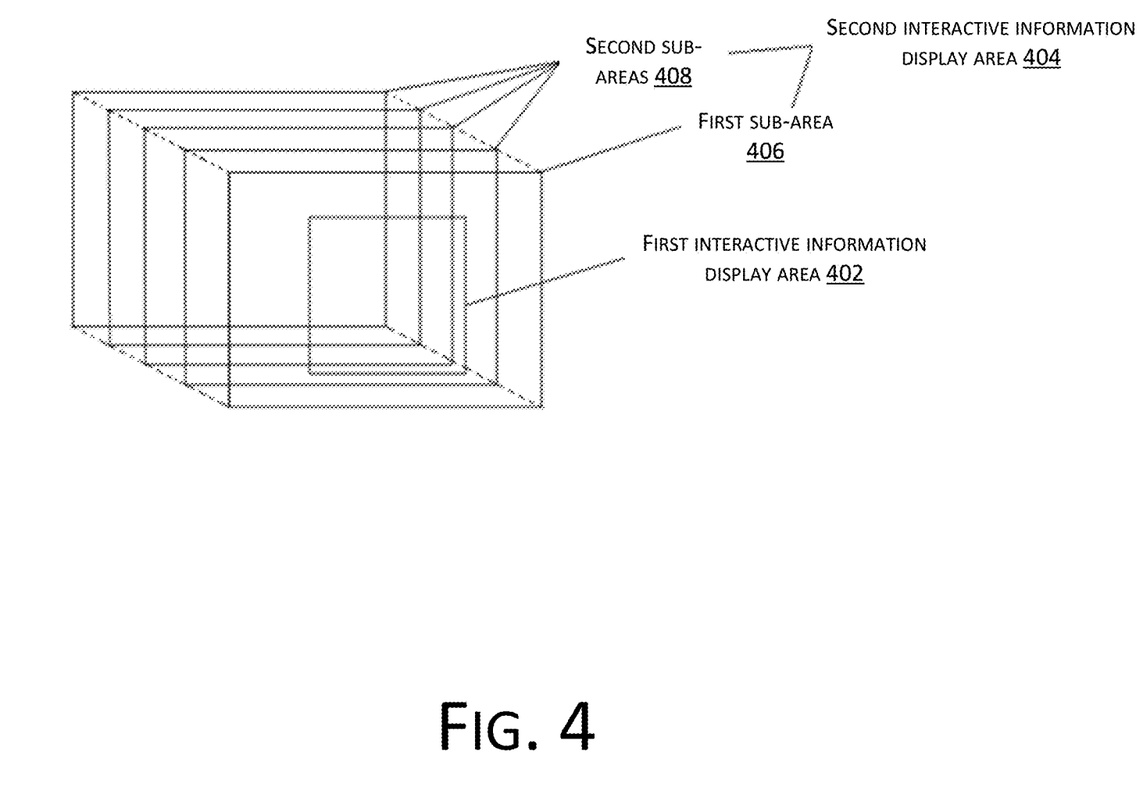
FIG. 4 illustrates a schematic diagram of an interactive information display area in accordance with an exemplary embodiment of the present disclosure.

FIG. 4 illustrates a schematic diagram of an interactive information display area in accordance with an exemplary embodiment of the present disclosure. In this exemplary embodiment, a background color of the first interactive information display area 402 is a semi-transparent gray color. The second interactive information display area 404 includes a first sub-area 406 that is coplanar with the first interactive information display area 402 and a plurality of second sub-areas 408 that are parallel to the first interactive information display area, each having a background color that is transparent. User comments can be displayed on the semi-transparent map layer 402. The first sub-area 406 and the second sub-areas 408 can be used for displaying a barrage. In the present example, the plurality of sub-areas of the second interactive information display area 404 can be regarded as a plurality of parallel planar areas that are located in a rectangular parallelepiped, with four edges of the rectangular parallelepiped being illustrated by broken lines in FIG. 4, for example.

Figure 5:
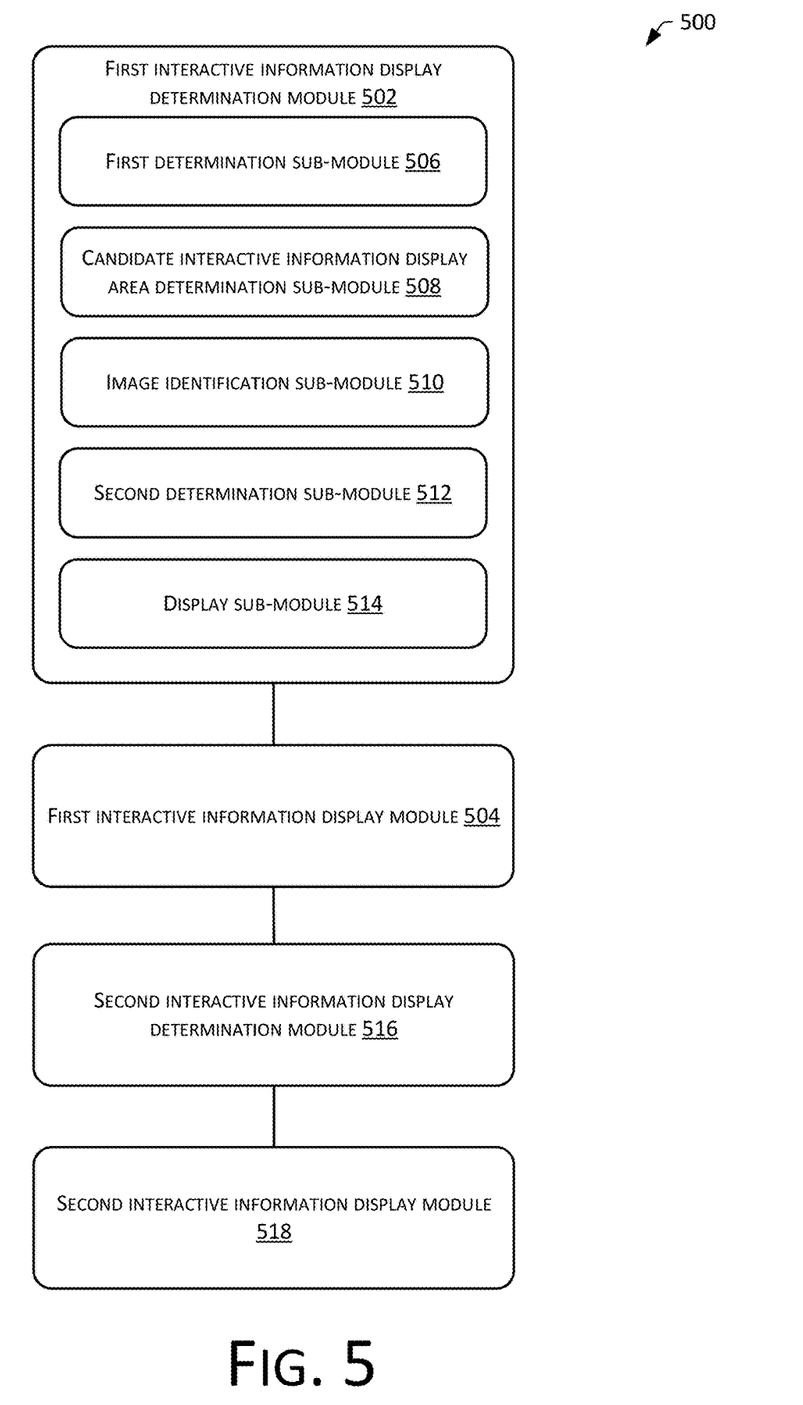
FIG. 5 illustrates a structural block diagram of an apparatus for displaying interactive information in a panoramic video according to an embodiment of the present disclosure.

FIG. 5 illustrates a structural block diagram of an apparatus 500 for displaying interactive information in a panoramic video according to an embodiment of the present disclosure. As shown in FIG. 5, the apparatus 500 may include a first interactive information display area determination module 502 configured to determine a first interactive information display area corresponding to a perspective of a first camera position of a panoramic video; and a first interactive information display module 504 configured to display first interactive information in the first interactive information display area corresponding to the perspective of the first camera position when playing an image associated with the perspective of the first camera position.

In implementations, the first interactive information display area determination module 502 includes a first determination sub-module 506 configured to determine a distance and an angle of the first interactive information display area relative to the perspective of the first camera position to determine the first interactive information display area corresponding to the perspective of the first camera position.

In implementations, the first interactive information display area determination module 502 includes a candidate interactive information display area determination sub-module 508 configured to determine at least one candidate interactive information display area corresponding to the perspective of the first camera position; an image identification sub-module 510 configured to identify an image of each candidate interactive information display area; and a second determination sub-module 512 configured to determine the first interactive information display area from the at least one candidate interactive information display area based on the identified image.

In implementations, the first interactive information display module 504 includes a display sub-module 514 configured to display a semi-transparent map layer in the first interactive information display area, and display the first interactive information on the semi-transparent layer.

In implementations, the apparatus 500 further includes a second interactive information display area determination module 516 configured to determine a second interactive information display area corresponding to the perspective of the first camera position based on the first interactive information display area corresponding to the perspective of the first camera position; and a second interactive information display module 518 configured to display second interactive information in the second interactive information display area corresponding to the perspective of the first camera position when playing the image associated with the perspective of the first camera position.

In implementations, the second interactive information display area includes a first sub-area that is coplanar with the first interactive information display area, and the first interactive information display area is located within the first sub-area.

In implementations, the panoramic video is a three-dimensional panoramic video, the first interactive information display area is a two-dimensional area, and the second interactive information display area includes at least one second sub-area that is is parallel to the first interactive information display area.

Figure 6:
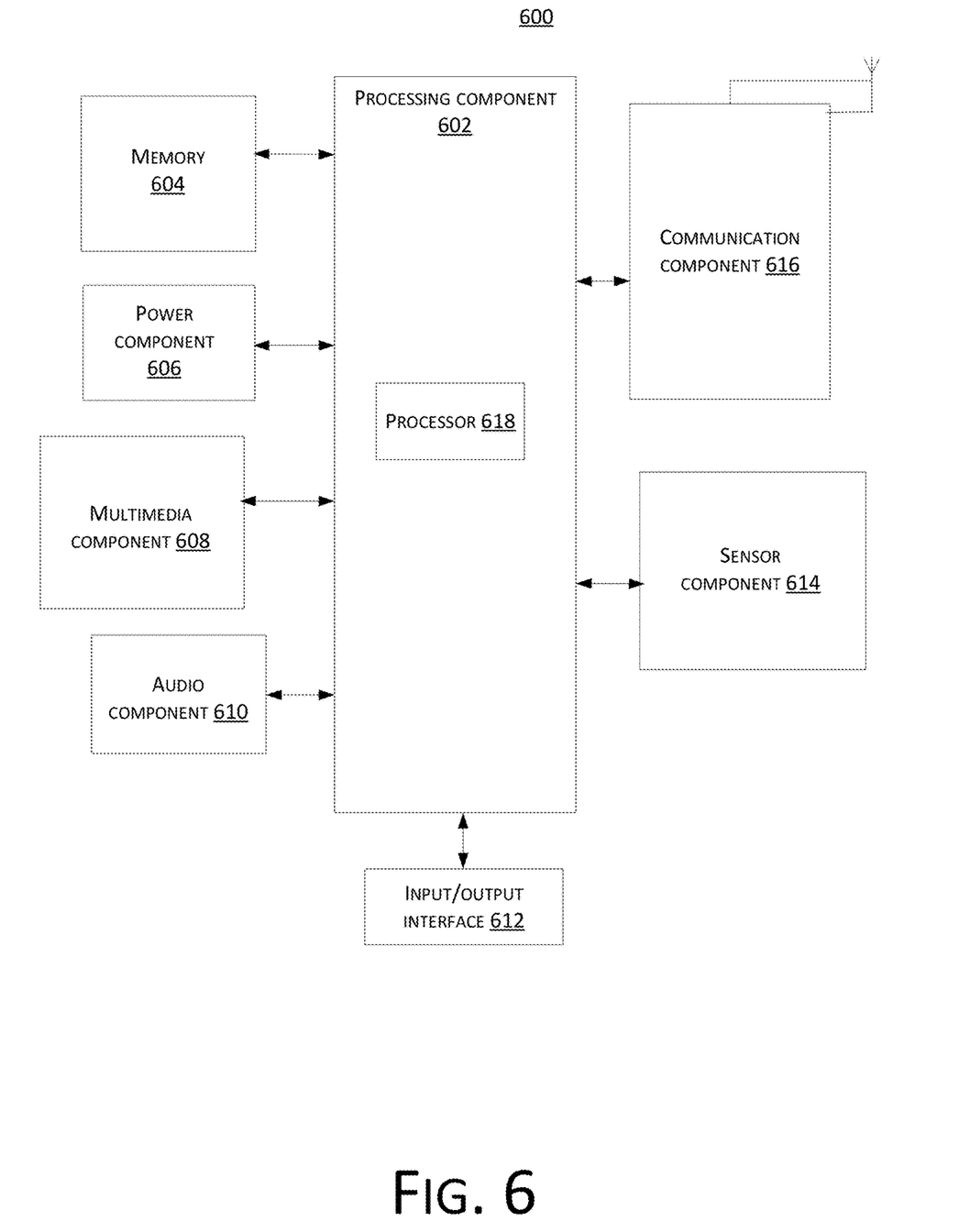
FIG. 6 illustrates a structural block diagram of an apparatus for displaying interactive information in a panoramic video according to an embodiment of the present disclosure.

FIG. 6 is a block diagram of an apparatus 600 for displaying interactive information in a panoramic video according to an exemplary embodiment. For example, the apparatus 600 may be any terminal device that enables a user to view a panoramic video. In implementations, the apparatus 600 may include one or more modules and/or sub-modules of the apparatus 500 as described in the foregoing description.

Referring to FIG. 6, the apparatus 600 may include one or more of the following components: a processing component 602, memory 604, a power component 606, a multimedia component 608, an audio component 610, an input/output (I/O) interface 612, a sensor component 614, and a communication component 616.

The processing component 602 typically controls overall operations of the apparatus 600, such as operations associated with display, telephone calls, data communications, camera operations, and recording operations. The processing component 602 may include one or more processors 618 to execute instructions to perform all or some operations of the above method. Moreover, the processing component 602 may include one or more modules to facilitate interactions between the component 602 and other components. For example, the processing component 602 may include a multimedia module to facilitate interactions between the multimedia component 608 and the processing component 602.

The memory 604 is configured to store various types of data to support operations at the apparatus 600. Examples of such data include instructions used for any application or method operating on the apparatus 600, contact data, phone book data, messages, images, videos, and the like. The memory 604 can be implemented by any type of volatile or non-volatile storage device, or a combination thereof, such as static random access memory (SRAM), electrically erasable programmable read only memory (EEPROM), erasable Programmable read only memory (EPROM), programmable read only memory (PROM), read only memory (ROM), magnetic memory, flash memory, a magnetic disk or an optical disk.

In implementations, the memory 604 may include a form of computer readable media such as a volatile memory, a random access memory (RAM) and/or a non-volatile memory, for example, a read-only memory (ROM) or a flash RAM. The memory 604 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The power component 606 provides power to various components of the apparatus 600. The power component 606 can include a power management system, one or more power sources, and other components associated with generating, managing, and distributing power for the apparatus 600.

The multimedia component 608 includes a screen that provides an output interface between the apparatus 600 and a user. In embodiments, the screen can include a liquid crystal display (LCD) and a touch panel (TP). If the screen includes a touch panel, the screen may be implemented as a touch screen to receive input signals from the user. The touch panel includes one or more touch sensors to sense touches, sliding actions, and gestures on the touch panel. The touch sensor may sense not only the boundary of a touch or sliding action, but also the duration and pressure associated with the touch or sliding action. In some embodiments, the multimedia component 608 includes a front camera and/or a rear camera. When the apparatus 600 is in an operation mode, such as a shooting mode or a video mode, the front camera and/or the rear camera can receive external multimedia data. Each of the front camera and the rear camera can be a fixed optical lens system or have focal length and optical zoom capabilities.

The audio component 610 is configured to output and/or input an audio signal. For example, the audio component 610 includes a microphone (MIC). The microphone is configured to receive an external audio signal when the apparatus 600 is in an operational mode, such as a call mode, a recording mode, and a voice recognition mode. The received audio signal may be further stored in the memory 604 or transmitted via the communication component 616. In some embodiments, the audio component 610 also includes a speaker used for outputting an audio signal.

The I/O interface 612 provides an interface between the processing component 602 and peripheral interface modules, which may be a keyboard, a click wheel, buttons, or the like. These buttons may include, but are not limited to, a home button, a volume button, a start button, and a lock button.

The sensor component 614 includes one or more sensors used for providing status assessment of various aspects to the apparatus 600. For example, the sensor component 614 can detect an open/closed state of the apparatus 600, relative positioning of components, such as a display and a keypad of the apparatus 600. The sensor component 614 can also detect changes in position of the apparatus 600 or one component of the apparatus 600, the presence or absence of contact of the user with the apparatus 600, orientation or acceleration/deceleration of the apparatus 600, and temperature variation of the apparatus 600. The sensor component 614 can include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an acceleration sensor, a gyro sensor, a magnetic sensor, a pressure sensor, or a temperature sensor.

The communication component 616 is configured to facilitate wired or wireless communications between the apparatus 600 and other devices. The apparatus 600 can access a wireless network based on a communication standard, such as WiFi, 2G or 3G, or a combination thereof. In implementations, the communication component 616 receives broadcast signals or broadcast associated information from an external broadcast management system via a broadcast channel. In implementations, the communication component 616 also includes a near-field communication (NFC) module to facilitate short range communications. For example, the NFC module can be implemented based on radio frequency identification (RFID) technology, infrared data association (IrDA) technology, ultra-wideband (UWB) technology, Bluetooth (BT) technology, and other technologies.

In implementations, the apparatus 600 may be implemented by one or more application specific integrated circuits (ASICs), digital signal processors (DSPs), digital signal processing devices (DSPDs), programmable logic devices (PLDs), field programmable gate array (FPGA), controllers, microcontrollers, microprocessors, or other electronic components, and is used for performing the above methods.

In implementations, a non-transitory computer readable storage media is also provided, such as the memory 604 that includes computer program instructions. The computer program instructions are executed by the processor 618 of the apparatus 600 to perform the above methods.

The present disclosure can be a system, a method, and/or a computer program product. The computer program product can include a computer readable storage media having computer readable program instructions embodied thereon for causing a processor to implement various aspects of the present disclosure.

The computer readable storage media can be a tangible device that can hold and store instructions used by an instruction execution device. The computer readable storage media can be, for example, but is not limited to, an electrical storage device, a magnetic storage device, an optical storage device, an electromagnetic storage device, a semiconductor storage device, or any suitable combination of the foregoing. More specific examples (a non-exhaustive list) of the computer readable storage media include a portable computer disk, a hard disk, random access memory (RAM), read only memory (ROM), erasable programmable read only memory (EPROM) or flash memory), static random access memory (SRAM), portable compact disk read only memory (CD-ROM), a digital versatile disk (DVD), a memory stick, a floppy disk, a mechanical encoding device such as a hole card or a raised structure in a groove on which instructions are stored, and any suitable combination of the above. A computer readable storage media used herein is not to be interpreted as transient signals per se, which include, for example, radio waves or other freely propagating electromagnetic waves, electromagnetic waves that propagate through a waveguide or other transmission media (e.g., light pulses through a fiber optic cable), or electrical signals transmitted through wires.

The computer readable program instructions described herein can be downloaded from a computer readable storage media to various computing/processing devices, or downloaded to external computers or external storage devices over a network, such as the Internet, a local area network, a wide area network, and/or a wireless network. The network may include copper transmission cables, fiber optic transmissions, wireless transmissions, routers, firewalls, switches, gateway computers, and/or edge servers. A network adapter card or network interface in each computing/processing device receives computer readable program instructions from the network and forwards the computer readable program instructions for storage in a computer readable storage media in the respective computing/processing device.

The computer program instructions used for performing the operations of the present disclosure may be assembly instructions, instruction set architecture (ISA) instructions, machine instructions, machine-related instructions, microcodes, firmware instructions, state setting data, or source codes or object codes written in any combination of one or more programming languages. The programming languages include object oriented programming languages such as Smalltalk, C++, etc., and conventional procedural programming languages such as "C" language or similar programming languages. The computer readable program instructions may be executed entirely on a user computer, executed partly on the user computer, executed as a stand-alone software package, executed partly on the user computer and partly on a remote computer, or executed entirely on the remote computer or a server. When a remote computer is involved, the remote computer can be connected to the user computer through any kind of network which includes a local area network (LAN) or a wide area network (WAN), or can be connected to an external computer (e.g., connected to access the Internet through an Internet service provider). In some embodiments, An electronic circuit, such as a programmable logic circuit, a field programmable gate array (FPGA), or a programmable logic array (PLA), can be customized by utilizing state information of computer readable program instructions. The electrical circuit can execute the computer readable program instructions, and thereby implement various aspects of the present disclosure.

Various aspects of the present disclosure are described herein with reference to flowcharts and/or block diagrams of methods, apparatuses, and computer program products according to the embodiments of the present disclosure. It can be understood that each block of the flowcharts and/or the block diagrams, and combinations of various blocks in the flowcharts and/or the block diagrams can be implemented by computer readable program instructions.

These computer readable program instructions can be provided to a general purpose computer, a special purpose computer or a processor of other programmable data processing apparatus to produce a machine, such that an apparatus that implements functions/acts specified in one or more blocks of the flowcharts and/or the block diagrams is produced when these instructions are executed by the computer or the processor of the other programmable data processing apparatus. The computer readable program instructions can also be stored in a computer readable storage media. These computer readable program instructions cause a computer, a programmable data processing device, and/or other devices to operate in a particular manner, such that the computer readable media storing the instructions includes an article of manufacture including instructions for implementing various aspects of functions/acts specified in one or more blocks of the flowcharts and/or the block diagrams.

The computer readable program instructions can also be loaded onto a computer, another programmable data processing device, or another device, such that a series of operational operations are executed on the computer, the other programmable data processing device or the other device to produce a computer-implemented process. Thus, instructions executed on the computer, the other programmable data processing device, or the other device implement functions/acts specified in one or more blocks of the flowcharts and/or the block diagrams.

The flowcharts and the block diagrams in the accompanying drawings illustrate architectures, functionalities and operations of possible implementations of systems, methods and computer program products in accordance with various embodiments of the present disclosure. In this regard, each block of a flowchart or a block diagram can represent a module, a program segment, or a portion of an instruction. The module, the program segment, or the portion of the instruction includes one or more executable instructions used for implementing specific logical functions. In some alternative implementations, functions noted in the blocks may also occur in an order different from that illustrated in the drawings. For example, two consecutive blocks may be executed substantially in parallel. They may sometimes be executed in a reverse order. This depends on functions that are involved. It is also noted that each block of the block diagrams and/or the flowcharts, and combinations of the blocks in the block diagrams and/or the flowcharts, can be implemented in a dedicated hardware-based system that performs specified functions or actions, or can be implemented by a combination of dedicated hardware and computer instructions.

The embodiments of the present disclosure have been described above, and the foregoing description is illustrative and is not limiting. The present disclosure is not limited to the embodiments that are disclosed. A number of modifications and changes are apparent to one skilled in the art without departing from the scope and spirit of various embodiments of the specification. The choice of terms used herein is intended to best explain the principles, practical applications, or technical improvements of the techniques of the various embodiments, or to enable one of ordinary skill in the art to understand the various embodiments disclosed herein.

The present disclosure can further be understood using the following clauses.

Clause 1: A method for displaying interactive information in a panoramic video, comprising: determining a first interactive information display area corresponding to a perspective of a first camera position of the panoramic video; and displaying first interactive information in the first interactive information display area corresponding to the perspective of the first camera position when playing an image associated with the perspective of the first camera position.

Clause 2: The method of Clause 1, wherein determining the first interactive information display area corresponding to the perspective of the first camera position of the panoramic video includes determining a distance and an angle of the first interactive information display area relative to the perspective of the first camera position, to determine the first interactive information display area corresponding to the perspective of the first camera position.

Clause 3: The method of Clause 1 or 2, wherein determining the first interactive information display area corresponding to the perspective of the first camera position of the panoramic video comprises: determining at least one candidate interactive information display area corresponding to the perspective of the first camera position; identifying an image of each candidate interactive information display area; and determining the first interactive information display area from the at least one candidate interactive information display area based on the identified image.

Clause 4: The method of Clause 1, wherein displaying the first interactive information in the first interactive information display area wherein a corresponding to the perspective of the first camera position comprises displaying a semi-transparent map layer in the first interactive information display area, and displaying the first interactive information on the semi-transparent map layer.

Clause 5: The method of Clause 1 or 4, further comprising: determining a second interactive information display area corresponding to the first camera position according to the first interactive information display area corresponding to the first camera position; and displaying second interactive information in the second interactive information display area corresponding to the perspective of the first camera position when playing the image associated with the perspective of the first camera position.

Clause 6: The method of Clause 5, wherein the panoramic video is a three-dimensional panoramic video, the first interactive information display area is a two-dimensional area, and the second interactive information display area includes a first sub-area that is coplanar with the first interactive information display area.

Clause 7: The method of Clause 5 or 6, wherein the panoramic video is a three-dimensional panoramic video, the first interactive information display area is a two-dimensional area, and the second interactive information display area includes at least one second sub-area that is parallel to the first interactive information display area.

Clause 8: An apparatus for displaying interactive information in a panoramic video, comprising: a first interactive information display area determination module used for determining a first interactive information display area corresponding to a perspective of a first camera position of the panoramic video; and a first interactive information display module used for displaying first interactive information in the first interactive information display area corresponding to the perspective of the first camera position when playing an image associated with the perspective of the first camera position.

Clause 9: The apparatus of Clause 8, wherein the first interactive information display area determination module comprises a first determination sub-module used for determining a distance and an angle of the first interactive information display area relative to the perspective of the first camera position, to determine the first interactive information display area corresponding to the perspective of the first camera position.

Clause 10: The apparatus of Clause 8 or 9, wherein the first interactive information display area determination module comprises: a candidate interactive information display area determination sub-module used for determining at least one candidate interactive information display area corresponding to the perspective of the first camera position; an image identification sub-module used for identifying an image of each candidate interactive information display area; and a second determination sub-module used for determining the first interactive information display area from the at least one candidate interactive information display area based on the identified image.

Clause 11: The apparatus of Clause 8, wherein the first interactive information display module comprises a display sub-module used for displaying a semi-transparent map layer in the first interactive information display area, and displaying the first interactive information on the semi-transparent map layer.

Clause 12: The apparatus of Clause 8 or 11, further comprising: a second interactive information display area determination module used for determining a second interactive information display area corresponding to the first camera position based on the first interactive information display area corresponding to the first camera position; and a second interactive information display module used for displaying second interactive information in the second interactive information display area corresponding to the perspective of the first camera position when playing the image associated with the perspective of the first camera position.

Clause 13: The apparatus of Clause 12, wherein the panoramic video is a three-dimensional panoramic video, the first interactive information display area is a two-dimensional area, and the second interactive information display area includes a first sub-area that is coplanar with the first interactive information display area.

Clause 14: The apparatus of Clause 12 or 13, wherein the panoramic video is a three-dimensional panoramic video, the first interactive information display area is a two-dimensional area, and the second interactive information display area includes at least one second sub-area that is parallel to the first interactive information display area.

Clause 15: An apparatus for displaying interactive information in a panoramic video, comprising: a processor; and a storage device configured to store processor executable instructions, wherein the processor is configured to perform the method of any one of Clauses 1-7.

Clause 16: A non-volatile computer readable storage media storing computer program instructions thereon, the computer program instructions performing the method of any one of Clauses 1-7 when executed by a processor.

What is claimed is:

1. A method comprising:
   determining, by a terminal device, a first interactive information display area corresponding to a perspective of a first camera position of a three-dimensional panoramic video;
   displaying, on the terminal device, first interactive information in the first interactive information display area when playing an image associated with the perspective of the first camera position on the terminal device, the first interactive information including user inputs provided by at least one user watching the three-dimensional panoramic video via a network;
   determining a second interactive information display area corresponding to the first camera position according to the first interactive information display area, the second interactive information display area including a first sub-area that is coplanar to the first interactive information display area and encompasses the first interactive information display area, and at least one second sub-area that is equal sized to and parallel to the first sub-area and is arranged in a different planar than the first sub-area; and
   displaying second interactive information in the second interactive information display area when playing the image, the second interactive information being generated based on the user inputs displayed on the first interactive information display area,
   wherein the first interactive information remains displayed on the first interactive information display area corresponding to the perspective when a user views the three-dimensional panoramic video in other perspectives on the terminal device,
   the first interactive information display area and the second interactive information display area are three-dimensional areas, and
   the first interactive information display area and the second interactive information display area have different display priorities.

2. The method of claim 1, wherein determining the first interactive information display area corresponding to the perspective of the first camera position of the three-dimensional panoramic video includes:
   determining a distance and an angle of the first interactive information display area relative to the perspective of the first camera position, so as to determine the first interactive information display area corresponding to the perspective of the first camera position.

3. The method of claim 1, wherein determining the first interactive information display area corresponding to the perspective of the first camera position of the three-dimensional panoramic video comprises:
   determining at least one candidate interactive information display area corresponding to the perspective of the first camera position;
   identifying an image of each candidate interactive information display area; and
   determining the first interactive information display area from the at least one candidate interactive information display area based on the identified image.

4. The method of claim 1, wherein displaying the first interactive information in the first interactive information display area corresponding to the perspective of the first camera position comprises:
- displaying a semi-transparent map layer in the first interactive information display area, and
- displaying the first interactive information on the semi-transparent map layer.

5. The method of claim 1, wherein the second interactive information display area includes at least one second sub-area that is parallel to the first interactive information display area.

6. An apparatus comprising:
- one or more processors;
- memory;
- a first interactive information display area determination module stored in the memory and executable by the one or more processors to determine a first interactive information display area corresponding to a perspective of a first camera position of a three-dimensional panoramic video;
- a first interactive information display module stored in the memory and executable by the one or more processors to display, on a display, first interactive information in the first interactive information display area corresponding to the perspective of the first camera position when playing an image associated with the perspective of the first camera position on the display, the first interactive information including user inputs provided by at least one user watching the three-dimensional panoramic video via a network;
- a second interactive information display area determination module configured to determine a second interactive information display area corresponding to the first camera position based on the first interactive information display area, the second interactive information display area including a first sub-area that is coplanar to the first interactive information display area and encompasses the first interactive information display area, and at least one second sub-area that is equal sized to and parallel to the first sub-area and is arranged in a different planar than the first sub-area; and
- a second interactive information display module configured to display second interactive information in the second interactive information display area when playing the image, the second interactive information being generated based on the user inputs displayed on the first interactive information display area,
- wherein the first interactive information remains displayed on the first interactive information display area corresponding to the perspective when a user views the three-dimensional panoramic video in other perspectives on the display,
- the first interactive information display area and the second interactive information display area are three-dimensional areas, and
- the first interactive information display area and the second interactive information display area have different display priorities.

7. The apparatus of claim 6, wherein the first interactive information display area determination module comprises a first determination sub-module configured to determine a distance and an angle of the first interactive information display area relative to the perspective of the first camera position, to determine the first interactive information display area corresponding to the perspective of the first camera position.

8. The apparatus of claim 6, wherein the first interactive information display area determination module comprises:
- a candidate interactive information display area determination sub-module configured to determine at least one candidate interactive information display area corresponding to the perspective of the first camera position;
- an image identification sub-module configured to identify an image of each candidate interactive information display area; and
- a second determination sub-module configured to determine the first interactive information display area from the at least one candidate interactive information display area based on the identified image.

9. The apparatus of claim 6, wherein the first interactive information display module comprises a display sub-module configured to display a semi-transparent map layer in the first interactive information display area, and display the first interactive information on the semi-transparent map layer.

10. One or more computer readable media storing executable instructions that, when executed by one or more processors, cause the one or more processors to perform acts comprising:
- determining, by a terminal device, a first interactive information display area corresponding to a perspective of a first camera position of a three-dimensional panoramic video; and
- displaying, on the terminal device, first interactive information in the first interactive information display area corresponding to the perspective of the first camera position when playing an image associated with the perspective of the first camera position on the terminal device, the first interactive information including user inputs provided by at least one user watching the three-dimensional panoramic video via a network,
- determining a second interactive information display area corresponding to the first camera position according to the first interactive information display area, the second interactive information display area including a first sub-area that is coplanar to the first interactive information display area and encompasses the first interactive information display area, and at least one second sub-area that is equal sized to and parallel to the first sub-area and is arranged in a different planar than the first sub-area; and
- displaying second interactive information in the second interactive information display area when playing the image, the second interactive information being generated based on the user inputs displayed on the first interactive information display area,
- wherein the first interactive information remains displayed on the first interactive information display area corresponding to the perspective when a user views the three-dimensional panoramic video in other perspectives on the terminal device,
- the first interactive information display area and the second interactive information display area are three-dimensional areas, and
- the first interactive information display area and the second interactive information display area have different display priorities.

11. The one or more computer readable media of claim 10, wherein determining the first interactive information display area corresponding to the perspective of the first camera position of the three-dimensional panoramic video includes determining a distance and an angle of the first interactive information display area relative to the perspective of the first camera position, to determine the first interactive information display area corresponding to the perspective of the first camera position.

12. The one or more computer readable media of claim 10, wherein determining the first interactive information display area corresponding to the perspective of the first camera position of the three-dimensional panoramic video comprises:
   determining at least one candidate interactive information display area corresponding to the perspective of the first camera position;
   identifying an image of each candidate interactive information display area; and
   determining the first interactive information display area from the at least one candidate interactive information display area based on the identified image.

13. The one or more computer readable media of claim 10, wherein displaying the first interactive information in the first interactive information display area corresponding to the perspective of the first camera position comprises displaying a semi-transparent map layer in the first interactive information display area, and displaying the first interactive information on the semi-transparent map layer.

14. The method of claim 1, wherein the second interactive information includes additional user inputs provided by the at least one user.

15. The method of claim 14, wherein the additional user inputs include emoji icons provided by the at least one user.

16. The method of claim 14, wherein
   the user inputs displayed in the first interactive information display area include at least one of user comments, user entering/leaving live broadcasts of the three-dimensional panoramic video, or reward information, and
   the additional user inputs include emoji icons generated based on the user inputs.

\* \* \* \* \*